United States Patent
Hashimoto

(10) Patent No.: US 6,668,068 B2
(45) Date of Patent: *Dec. 23, 2003

(54) IMAGE ATTRIBUTE ALTERING DEVICE AND ELECTRONIC WATERMARK EMBEDDING DEVICE

(75) Inventor: Masahiro Hashimoto, Tokyo (JP)

(73) Assignee: NEC Corporation, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/313,543

(22) Filed: May 14, 1999

(65) Prior Publication Data

US 2003/0138126 A1 Jul. 24, 2003

(30) Foreign Application Priority Data

May 15, 1998 (JP) .......................... 10-133852

(51) Int. Cl.⁷ ................................ G06K 9/00
(52) U.S. Cl. .................. 382/100; 382/250; 380/203
(58) Field of Search ................ 382/100, 250, 382/239, 235, 232; 380/201, 235, 255, 202, 51, 217, 207, 268, 206, 203; 283/43

(56) References Cited

U.S. PATENT DOCUMENTS

| | | | | |
|---|---|---|---|---|
| 5,073,925 A | * | 12/1991 | Nagatal et al. | 360/60 |
| 5,264,933 A | * | 11/1993 | Rosser et al. | 348/578 |
| 5,627,655 A | * | 5/1997 | Okamoto et al. | 380/203 |
| 5,748,229 A | * | 5/1998 | Stoker | 348/180 |
| 5,778,140 A | * | 7/1998 | Okamoto et al. | 380/203 |
| 6,175,639 B1 | * | 1/2001 | Satoh et al. | 382/100 |

FOREIGN PATENT DOCUMENTS

| | | |
|---|---|---|
| EP | 0 581 227 A2 | 2/1994 |
| EP | 0 860 997 A2 | 8/1998 |
| JP | H06-22119 | 1/1994 |
| JP | 7-212712 | 8/1995 |
| JP | 8-241403 | 9/1996 |
| JP | 8-275127 | 10/1996 |
| JP | 9-191394 | 7/1997 |
| JP | H-09191394 | 7/1997 |
| WO | WO 98 03014 | 1/1998 |

OTHER PUBLICATIONS

"NEC Data Hiding Proposal", Response to Call for Proposal Issued by the Data Hiding Subgroup Copy Protection Technical Working Group, Version 1.0 Jul. 1, 1997.
Nikkei Electronics, Feb. 24, 1997 (No. 683).
Nikkei Electronics, Mar. 10, 1997 (684).
"Development of Electronic Watermark Technology for DVD Moving Images" (Japanese), NEC Gihou, vol. 51, No. 9. pp 166–171.
"Secure Spread Spectrum Watermarking for Multimedia". IEEE Transactions on Image processing, vol. 6, No. 12, Dec. 1997.

* cited by examiner

Primary Examiner—Jayanti K. Patel
Assistant Examiner—Sheela Chawan
(74) Attorney, Agent, or Firm—Scully, Scott, Murphy & Presser

(57) ABSTRACT

Image attribute detection means for detecting the attribute of an input image (attribute "A") and image attribute altering means for altering the image attribute in the input image on the basis of the attribute detection result of the input image are provided to output an output image having a new attribute (attribute "B"). The image attribute detection means includes first DCT means for subjecting the input image to discrete cosine transform to obtain frequency components, second DCT means for subjecting the original image to discrete cosine transform to obtain original frequency components, and means of subtracting the original frequency components from the image frequency components and dividing the subtraction result by the image frequency components to detect the electronic watermark data.

4 Claims, 11 Drawing Sheets

IMAGE ATTRIBUTE ALTERING DEVICE AND ELECTRONIC WATERMARK EMBEDDING DEVICE

BACKGROUND OF THE INVENTION

1. Field of the Invention

The present invention relates to an image attribute altering device based on electronic watermark data, and particularly to an image attribute altering device based on electronic watermark data and an electronic watermark embedding device for embedding (inserting) electronic watermark data in which copyright owner ship is authenticated, infringement of copyright is easily searched, and electronic watermark (which is also referred to as digital watermark) which is used for audio, images video, multimedia, etc. is applied to provide specific attribute to electronically watermarked audio, images, etc., thereby restricting the copies of the audio, images, or so like.

2. Description of the Related Art

Recently, electronified media such as audio, images, video, multimedia, etc. have been increased, and also there has been required a guarantee system which can easily check intellectual proprietary rights such as copyright, etc. and data sources. An encryption system in which data are temporarily enciphered and only a proprietor can decipher the enciphered data is effective as a simple checking method as described above, and a method of subjecting original media to electronic watermarking has been known as an encryption system as described above Further, from the viewpoint of protecting the copyright, there has been generalized that an attribute is provided to an original image to prohibit the original image from being copied or allow the original image to be copied only once or specific several times.

In order to alter the attribute of the image as described above, an attribute to be embedded during a vertical blanking period is generally altered. If the alteration of the attribute is allowed to be easily performed, the protection of the copyright cannot be sufficiently achieved. Accordingly, it has been required to prevent unjust copy of digital images on the basis of specific restricting conditions.

With respect to the attribute inserted during the vertical blanking period, it has been proposed in Japanese Laid-open Patent Application No. Hei-8-275127 that an identification signal to be inserted during the vertical blanking period (which is referred to as "VBI signal", "video ID" or the like. In the following description, it is referred to as "VBI signal") is used to prohibit or allow the copy of analog video signals of 525 line/60 field. The VBI signal is inserted into each of 20-th (first field) and $283^{rd}$ (second field) horizontal periods (1H) during a vertical blanking period in video signals of one frame, and 20-bit reference and 20-bits digital signal are inserted into an effective video signal area after a horizontal synchronous signal and a color burst signal. CGMS (Copy Generation Management System) information representing copy allowance/prohibition is transmitted by 2 bits of the 20-bit digital signal.

The method of transmitting the CGMS information by using the VBI signal described above is applicable to analog signals such as 525-line standard video signals in NTSC system, 625-line standard video signals in PAL system or high-definition video signals such as high-vision signals or the like. However, the VBI signal is inserted to a predetermined place, and it can be easily removed by image processing such as filtering or the like, so that unjust copying of data cannot be prevented.

Therefore, there has been considered a method of embedding (inserting) electronic watermark data into an original image to prevent unjust use and unjust copy of the digital image.

Two kinds of watermark data, that is, visible electronic watermark data and invisible electronic watermark data are proposed as electronic data to digital images.

The visible electronic data is obtained by synthesizing special characters or symbols for images so that the characters or symbols are visible. It induces deterioration of image quality, however, has such an effect that it makes a visible appeal to users of digital images to prevent unjust flow of the images.

Japanese Laid-open Patent Application No. Hei-8-241403 discloses an embedding (inserting) manner of visible electronic watermark data. This publication discloses a method of forming a electronic watermarked image, which comprises a step of supplying a digital original image, a step of supplying a digital watermark image, a step of forming a watermarked image by superposing the watermark image on the original image without altering chromaticity of pixels of the original image when the watermarking is carried out, thereby placing the visible watermark on the digital image. The electronic watermarked image forming step contains a step of correcting pixels corresponding to the original image by altering the brightness (not color) for each of pixels which are not "transparent" in the watermarked image. In this method, when the visible electronic watermark data are combined with the original image in this method, the electronic watermark data are combined with the original image so that only the brightness of the pixels corresponding to the opaque portion of the electronic watermark data are varied and no color component is varied. At this time, the scaling value of the variation of the brightness component of the pixels is determined in accordance with the color component, random number, the pixel value of the electronic watermark data. The conspicuousness of the watermark is determined by the scaling value.

Further, the invisible electronic watermark data are embedded into the original image so that much attention is paid to prevention of deterioration in image quality, and it is visually insensible because it has little deterioration in image quality.

As described above, if specific information with which the identification of a copyright holder is enabled is embedded as the electronic watermark data, the copyright holder can be identified by detecting the electronic watermark data even after an unjust copying is carried out. Further, if copy prohibiting information is embedded, when a reproducing device detects the copy-prohibiting information, a user may be made to be informed of the fact that the data are copy-prohibited data, or a copy preventing mechanism in the reproducing device may be drive to restrict the copy of the data to VTR or the like.

In order to embed the invisible electronic watermark data into digital images, there is known a method of embedding specific information as electronic watermark data into a portion having little effect on the image quality, such as LSB (Lease Significant Bit) of pixel data. However, even when the above method is used, it is still easy to remove the electronic watermark data from images. For example, the information of LSB of pixels would be lost if a low pass filter is used, and also the image compression processing aims to reduce the total data amount by omitting the information amount of such a portion having little effect on image quality. Therefore, the electronic watermark data are lost by the image processing, and thus there is such a problem that it is difficult to re-detect the electronic watermark data.

A method of subjecting an image to frequency conversion and embedding electronic watermark data into an area where the frequency component of a video signal after the frequency conversion is strong has been also proposed as another example of the method of subjecting an image to frequency transformation by using a low pass filter ("Nikkei Electronics", 1996. 4. 22 (no. 66), p 13). According to this paper, as a method of installing ID information into a digital work, inherent ID information is installed every purchaser of a work (moving pictures, still pictures, photographs and sounds are targeted), and the ID information is used to expose works (publications, etc.) which were unjustly copied by persons other than the purchasers, and the electronic watermark data are embedded into the frequency components of the original works. Therefore, the electronic watermark data are not lost through the image processing such as compression processing, filtering or the like. Further, by using a normal distribution type random numbers as electronic watermark data, the interference between the electronic watermark data is prevented, and the destruction of the electronic watermark data is made hard without having no effect on the overall image.

FIG. 7 shows the construction described in this paper. The method of embedding the electronic watermark data according to the above method is as follows. First, an original image 701 is converted to frequency components by using DCT (Discrete Cosine Transformation) 703. Data of n which show high amplitude in the frequency area are selected, and they are represented as follows:

$$f(1), f(2), \ldots, f(n)$$

w(1), w(2), ..., w(n) of the electronic watermark data 701 are selected from a normal distribution whose average and dispersion are equal to 0 and 1 respectively, and the following equation is calculated for each (i) in electronic watermark data embedding means 704:

$$F(i)=f(i)+\alpha \times |f(i)| \times w(i)$$

According to the electronic watermark data embedding means 704, the output (f(i)) of DCT 703 is multiplied by the electronic watermark data 702 (w(i)) in a multiplier 305, and the multiplication result (|f(i)|×w(i)) is multiplied by a scaling element a 706 in a multiplier 707. The multiplication result (α×|f(i)|×w(i)) is added with the output of DCT 7 in an adder 708 to obtain F(i).

Finally, by inverse DCT (inverse Discrete Cosine Transform) 709, an output image 710 in which the electronic watermark data are embedded is obtained from the frequency components obtained by converting f(i) to F(i).

Detection of the electronic watermark data is performed as follows. In this detection method, an original image 801 and electronic watermark data candidates w(i) (i=1, 2, ..., n) 809 must be known.

Referring to FIG. 8, a target image 802 containing the electronic watermark data is converted to frequency components by using DCT 804 to obtain the following frequency components: F(1), F(2), ..., F(n). Further, the original image 801 is also converted to frequency components by using DCT 803 to obtain the following frequency components: f(1), f(2), ..., f(n). On the basis of f(i) and F(i) thus obtained, the electronic watermark data estimation value W(i) is calculated and extracted according to the following equation (f(i) is subtracted from F(i) in a subtracter 806, and then the subtraction result is divided by f(i)) in a divider 807) in the electronic watermark data detection means 805:

$$W(i)=(F(i)-f(i))/f(i)$$

Subsequently, statistical similarity C is calculated according to the following equation by using the vector inner product between the output W(i) of the electronic watermark data detection means 805 and the electronic watermark data w(i) in an inner product calculator 808:

$$C=W \times w/(WD \times wD)$$

Here,
W=(W(1), W(2), ..., W(n)),
w=(w(1), w(2), ..., w(n))
WD=absolute value of vector W
wD=absolute value of vector w Statistical similarity judgment means 810 judges that the electronic watermark data concerned are embedded if the statistical similarity C is equal to or more than a specific value.

If the electronic watermark data are embedded into an image by using the above method, this is effective to a case where a copyright proprietor owing an original image carries out the detection processing on digital image data which seems to be unjustly copied.

The above method needs the original image, and thus it is effective to only the case where the copyright proprietor owning the original image performs the detection processing on image data which seem to be unjustly copied, however, the reproducing device of each terminal cannot perform the detection processing of electronic watermark data because it has no original image. Therefore, a method obtained by improving the above method so that it is applicable to terminal processing, particularly an MPEG system has been proposed.

Referring to FIG. 9, according to this improved method, an original image 901 is divided into blocks 902 of 8 pixels×8 pixels, and the embedding and extracting processing of electronic watermark data is performed by using the block 902 as a processing unit.

Electronic watermark data embedding means 905 performs the frequency conversion through MPEG coding processing by using DCT 903. The AC components in a frequency area are represented by f(1), f(2), ..., f(n) in increasing order of frequency component. Further, the electronic watermark data 904: w(1), w(2), ..., w(n) are selected from a normal distribution having an average of 0 and a dispersion of 1, and the following equation is calculated for each i in the electronic watermark data embedding means 905:

$$F(i)=f(i)+\alpha \times \mathrm{avg}(f(i)) \times w(i)$$

Here, α represents a scaling element, and avg(f(i)) represents a partial average obtained by averaging the absolute points at three points in the neighborhood of f(i). Specifically, f(i) is subjected to partially averaging operation in a partial average unit 906, the partial average is multiplied by the electronic watermark data w(i) 904, the multiplication result avg(f(i))×w(i) is multiplied by a constant a in a multiplier 909, and the multiplication result α×avg(f(i))×w(i) is added with the output of DCT 903 in an adder 910. f(i) is replaced by F(i), and the subsequent processing of the MPEG coding processing is carried out. The output F(i) of the electronic watermark data embedding means 905 is quantized according to a quantizing table 912 by a quantizer 911 and then coded in a encoder 913 to obtain MPEG data.

Subsequently, the detection of the electronic watermark data is carried out for the MPEG data by the following method. In the following detection method, no original image is needed, and it is sufficient that the electronic watermark data w(i) (i=1, 2, . . . , n) has been known.

Referring to FIG. 10, the MPEG data 1001 are decoded in a decoder 1002, and then inversely quantized in an inverse quantizer 1003 to be expanded. Therefore, the inversely quantized data are subjected to inverse discrete cosine transform in an inverse DCT unit 1004 to obtain electronically watermarked image data 1005. The image data thus obtained are supplied to a display unit, whereby a display image containing an electronic watermark is obtained.

The electronic watermark data F(i) in the frequency area of the block after the inverse quantization of the MPEG expansion processing is completed is represented by F(1), F(2), . . . , F(n) in increasing order of frequency component. The average value of the absolute values at three points in the neighborhood of F(i) is calculated as a partial average avg(F(i)) by a partial average unit 1007, and then F(i) is divided by the partial average avg(F(i)) in a divider 1008 to obtain electronic data w(i) as follows:

$$W(i)=F(i)/\text{avg}(F(i))$$

Further, the sum WF(i) of the W(i) values of one image is calculated as follows in an adder 1009: WF(i)=W(1)+W(2)+ . . . +W(n), and the above sum is calculated for each (i). Subsequently, WF(i) and the electronic watermark data w(i) 1011 are input to an inner product calculator 1010 to calculate the inner product therebetween, and the statistical similarity C is calculated by using the vector inner product as follows:

$$C=WF\times w/(WFD\times wD)$$

Here,
 WF=(WF(1), WF(2), . . . , WF(n))
 w=(w(1), w(2), . . . , w(n)),
 WFD=absolute value of vector WF
 wD=absolute value of vector w If the statistical similarity C is above a predetermined specific value, the statistic similarity judgment means 1012 judges that the electronic watermark data concerned are embedded.

FIG. 11 shows a detection method of electronic watermark data of an image after the MPEG expansion processing is completed. Image data 1101 are subjected to discrete cosine transform in a DCT unit 1102, and the image data thus transformed are represented by F(1), F(2), . . . , F(n) in increasing order of frequency component in the frequency area of the image block by the electronic watermark data detection means 1103. The average value of the absolute values at three points is calculated as a partial average avg(F(i)) in a partially averaging unit 1104, and then the electronic watermark data W(i) is calculated as follows:

$$W(i)=F(i)/\text{avg}(F(i))$$

Further, the sum WF(i) of W(i) of one image is calculated every (i) in an adder 1105. Subsequently, the statistical similarity C between the electronic watermark data w(i) 1106 and WF(i) is calculated according to the following equation by using the vector inner product in an inner product calculator 107:

$$C=WF\times w/(WFD\times wD)$$

Here,
 WF=(WF(1), WF(2), . . . , WF(n)),
 w=(w(1), w(2), . . . , w(n)),
 WFD=absolute value of vector WF
 wD=absolute value of vector w If the statistical similarity C is above a specific value, a statistical similarity judgment means 1109 judges that the electronic watermark data concerned are embedded.

The electronic watermark data are detected from an image containing the electronic watermark data concerned and then the electronic watermark data concerned are subtracted from the image, whereby an original image can be obtained. In this case, any person other than the copyright proprietor can also obtain the original image by using this detection device, and thus the reproduction of the original image which is contrary to a copyright-proprietor's will is possible. Therefore, a further improved encryption technique or enhanced secrecy has been required.

SUMMARY OF THE INVENTION

The present invention has been implemented in view of the foregoing situation, and has an object to further enhance secrecy for original media such as an original image or the like, clarify a copy-prohibited range and provide an attribute to allow only copies which are subject to a copyright-proprietor's will.

In order to attaint the above object, an image attribute altering device according to a first aspect of the present invention includes image attribute detection means for detecting an input image (attribute "a") and the attribute of the input image, and image attribute altering means for altering the image attribute in the input image in accordance with the attribute detection result of the input image, whereby an output image (attribute "B") having a new attribute is output.

Further, in order to attain the above object, an electronic watermark embedding device according to a second aspect of the present invention includes discrete cosine transforming means for subjecting an input image to discrete cosine transform, electronic watermark embedding means for inserting electronic watermark data into the data obtained by the discrete cosine transforming means, electronic watermark detection means for detecting whether the electronic watermark data to be inserted by the electronic watermark embedding means have been already inserted in the input image, and selection means for make the input image through if it is detected by the electronic watermark detection means that the electronic watermark data has been already inserted in the input image, or embedding new electronic watermark data into the input image if it is detected by the electronic watermark detection means that any electronic watermark data has not yet been embedded in the input image.

DETAILED DESCRIPTION OF THE PREFERRED EMBODIMENTS

Preferred embodiments according to the present invention will be described hereunder with reference to the accompanying drawings.

First Embodiment

Figure 1:
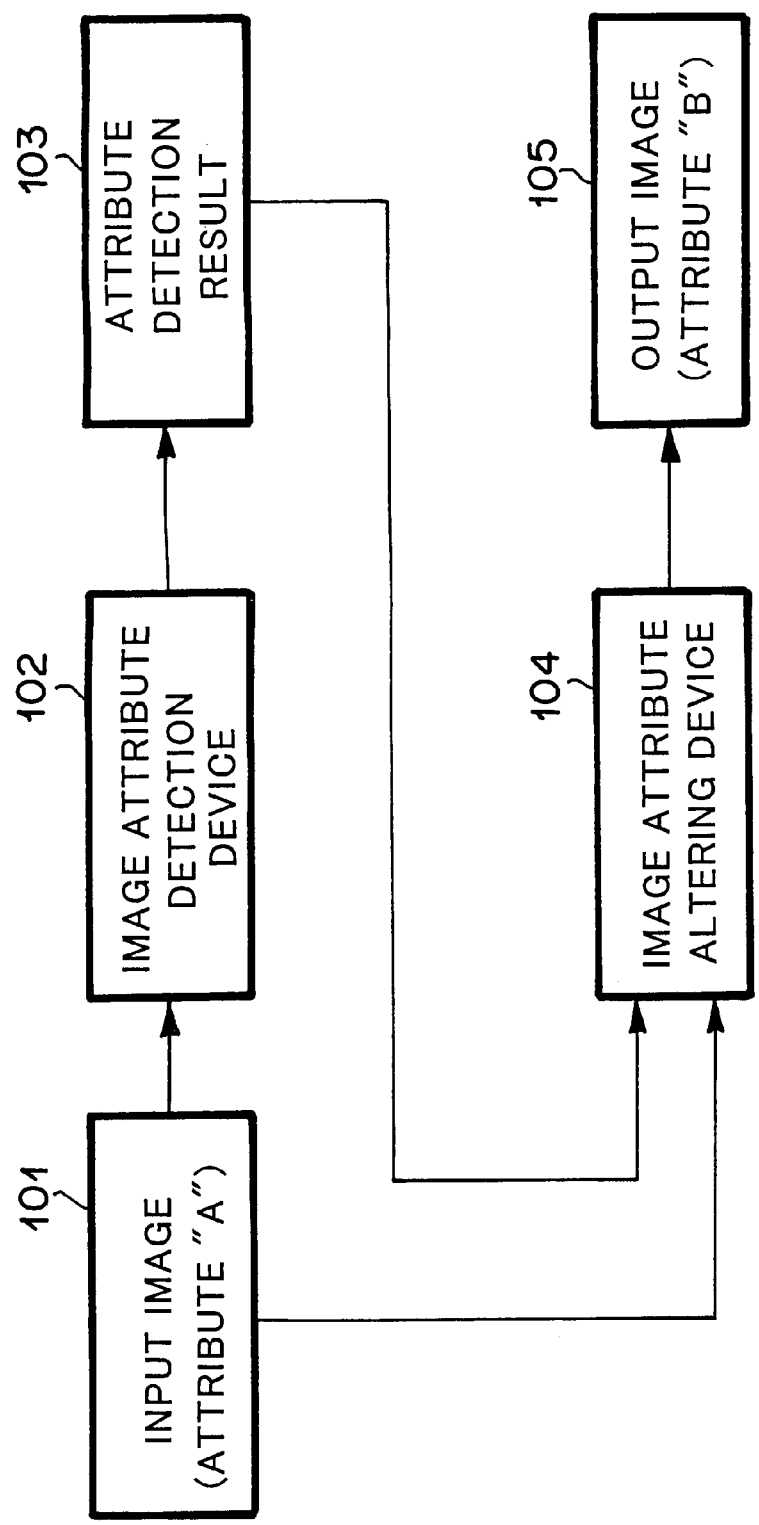
FIG. 1 is a block diagram showing an image attribute altering device according to an embodiment of the present invention.

FIG. 1 is a block diagram showing an attribute alteration processing device according to a first embodiment of the present invention.

In FIG. 1, an input image 101 has an attribute "A" on the basis of electronic watermark data which are beforehand embedded in the input image 101. An image attribute detection device 102 extracts the embedded electronic watermark data to detect an image attribute. That is, the input image 101 is input to the image attribute detection device 102 to detect the image attribute, thereby obtaining an attribute detection result 103 (attribute "A"). The attribute detection result 103 and the input image 101 are input to an image attribute altering device 104. The image attribute altering device 104 alters the attribute and outputs an output image (attribute "B") having a new attribute.

The image attribute altering device 104 executes the operation of altering the attribute ("a") of the image before the new electronic watermark data are inserted, and then obtaining the image having the new attribute ("B"). Accordingly, by defining the meaning of the attribute "A" as "copy is allowed only once" and defining the meaning of the attribute "B" as "copy prohibited", the image data whose attribute is altered to "B" are afterwards prohibited from being copied, thereby protecting the copyright.

Next, the construction of the image attribute detection device 102 of FIG. 1 will be described with reference to FIG. 2.

Figure 2:
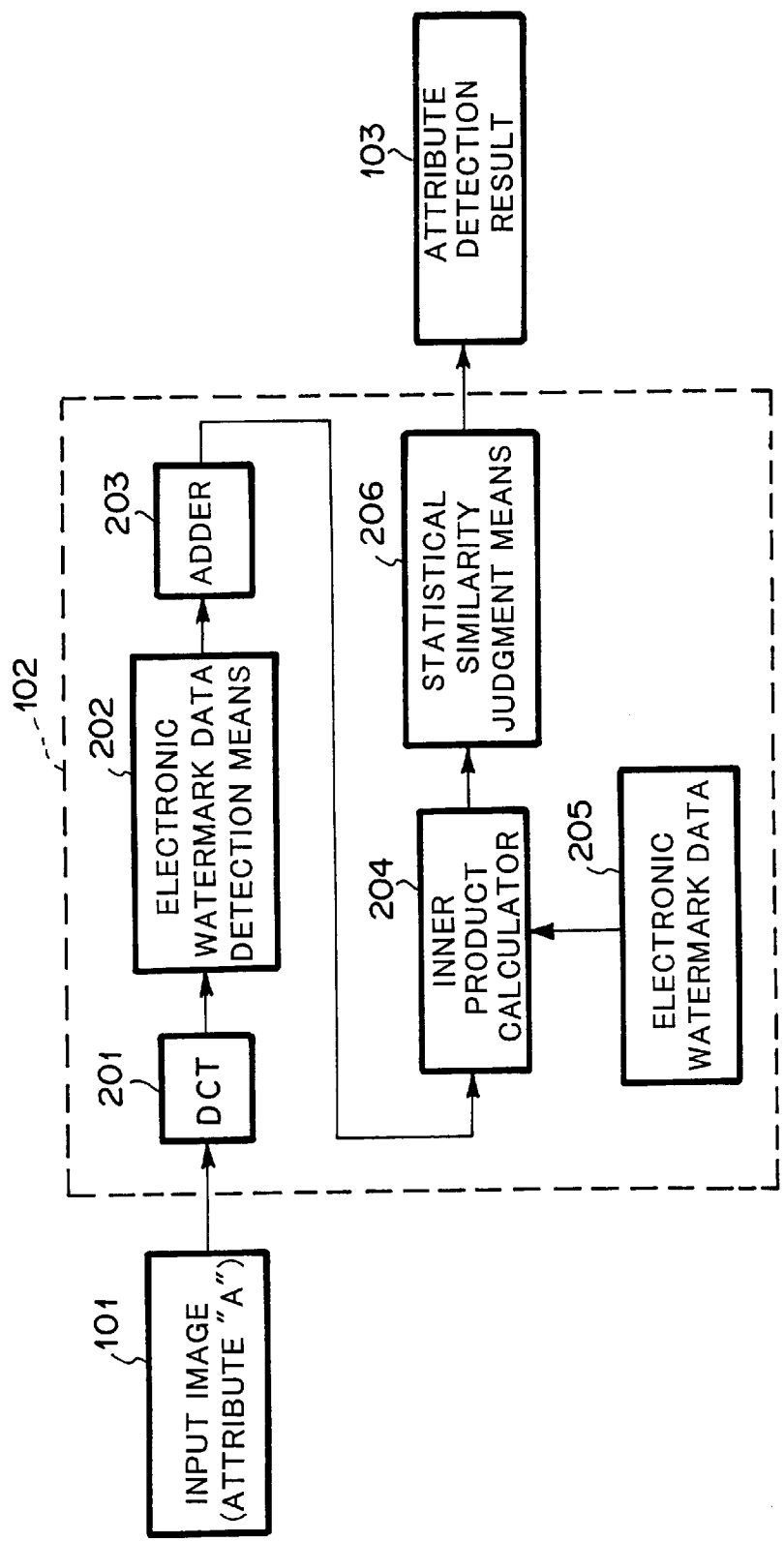
FIG. 2 is a block diagram showing an image attribute detection device according to the embodiment of the present invention.
Figure 11:
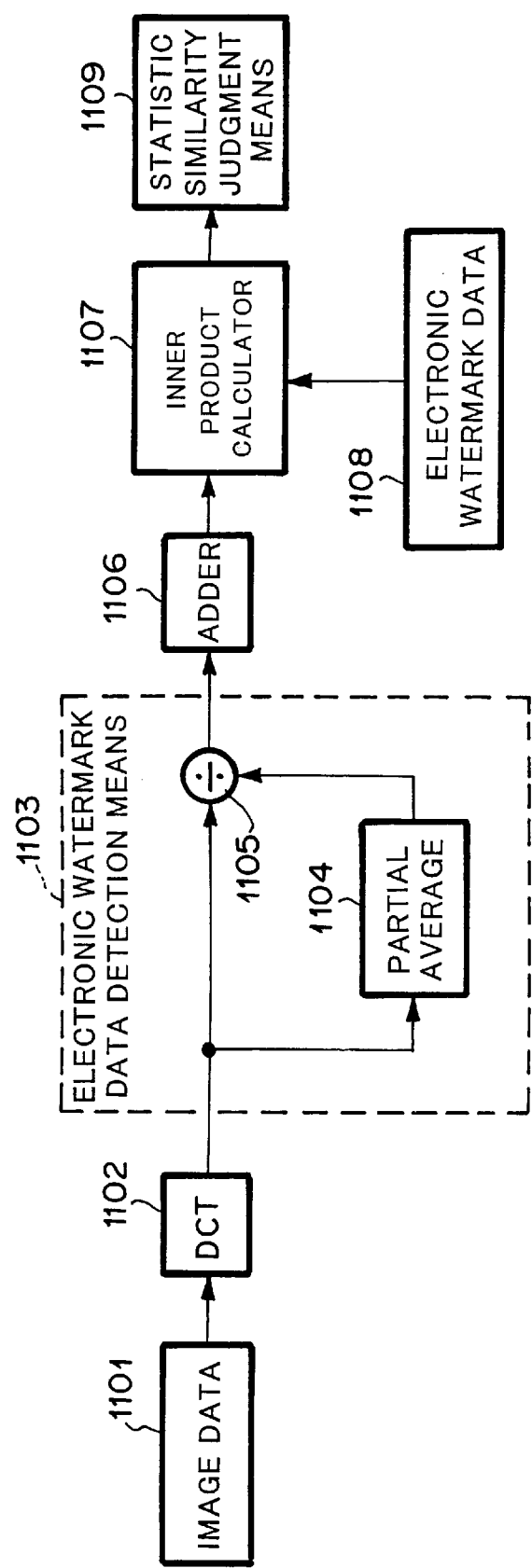
FIG. 11 is a block diagram showing a conventional electronic watermark data detection device.

In FIG. 2, the input image 101 having the attribute ("A") is converted to frequency components by DCT 201. In the frequency area, an electronic watermark data estimated value is extracted in electronic watermark data detection means 202. The statistical similarity C between known electronic watermark data and the electronic watermark data estimated value is calculated to obtain an attribute detection result 103 of the input image 101. The detail construction is the same as the prior art shown in FIG. 11, and it will be described later.

Here, a normal electronic watermark data inserting (embedding) method will be described with reference to FIG. 7.

Figure 7:
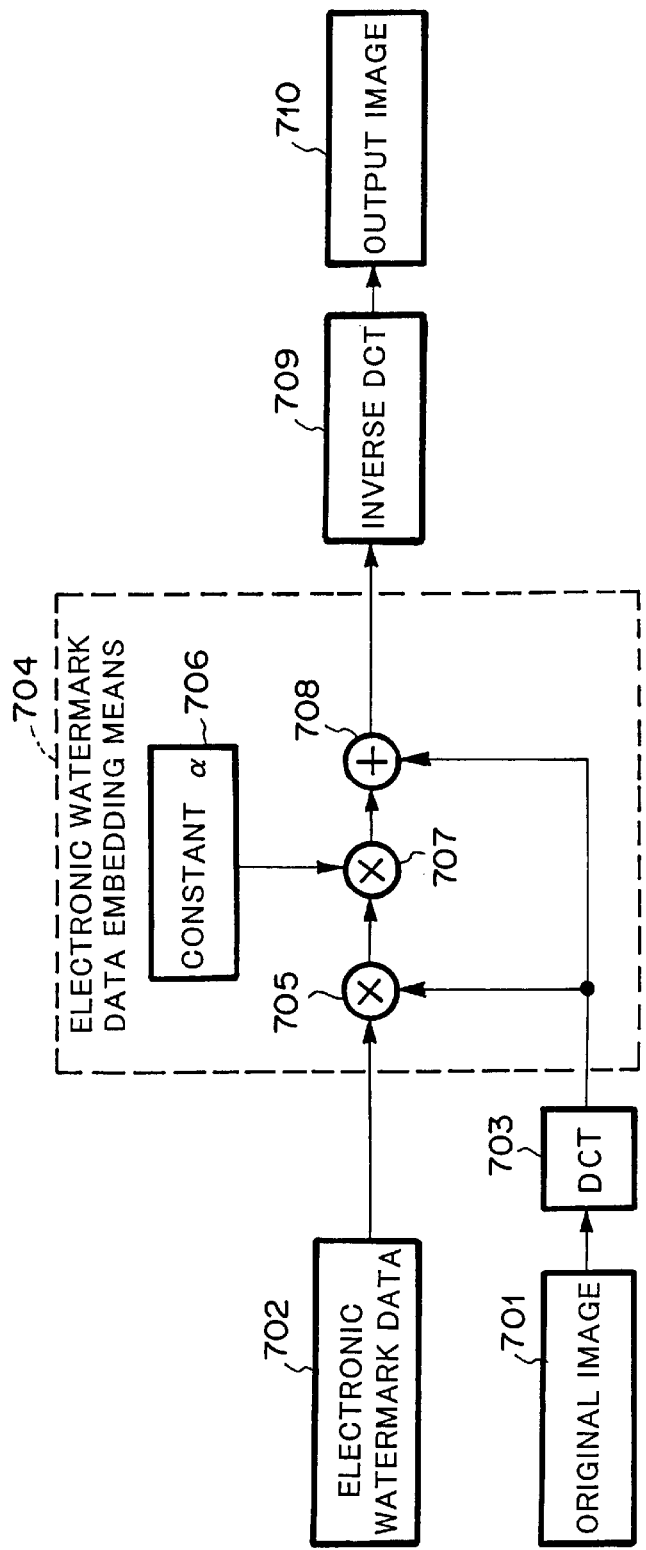
FIG. 7 is a block diagram showing a conventional electronic watermark data insertion device.
Figure 8:
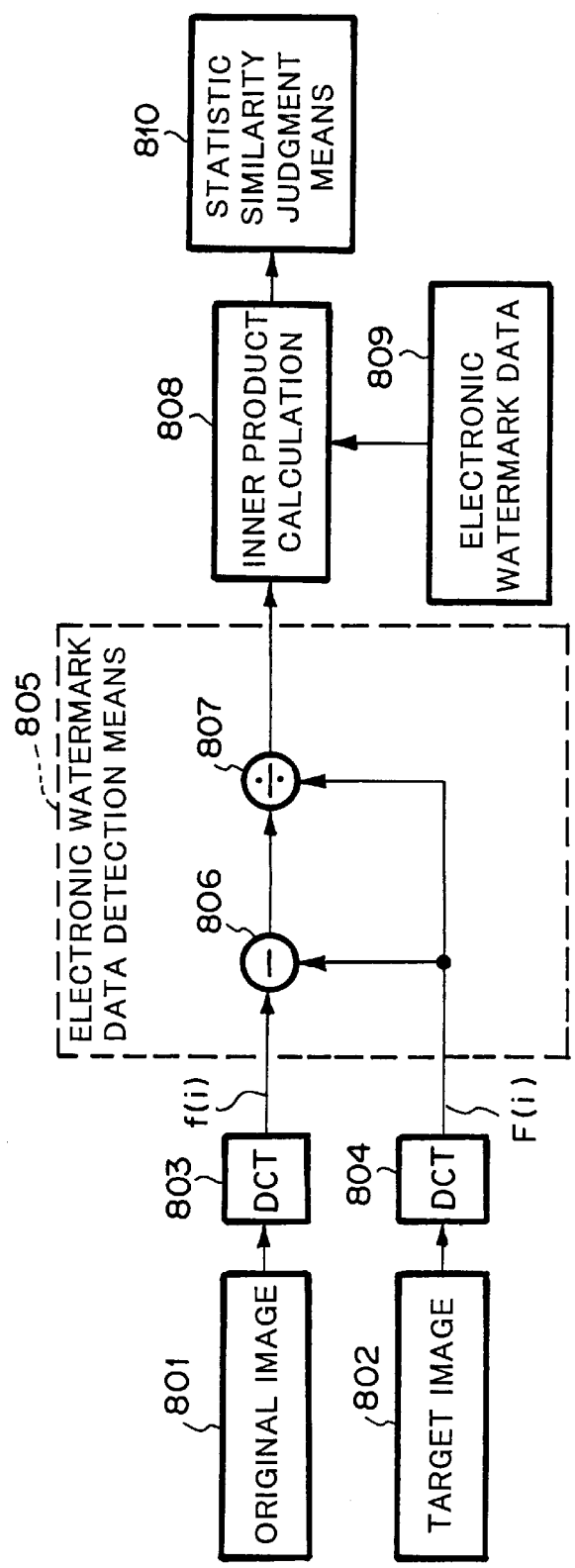
FIG. 8 is a block diagram showing a conventional electronic watermark detection device.
Figure 9:
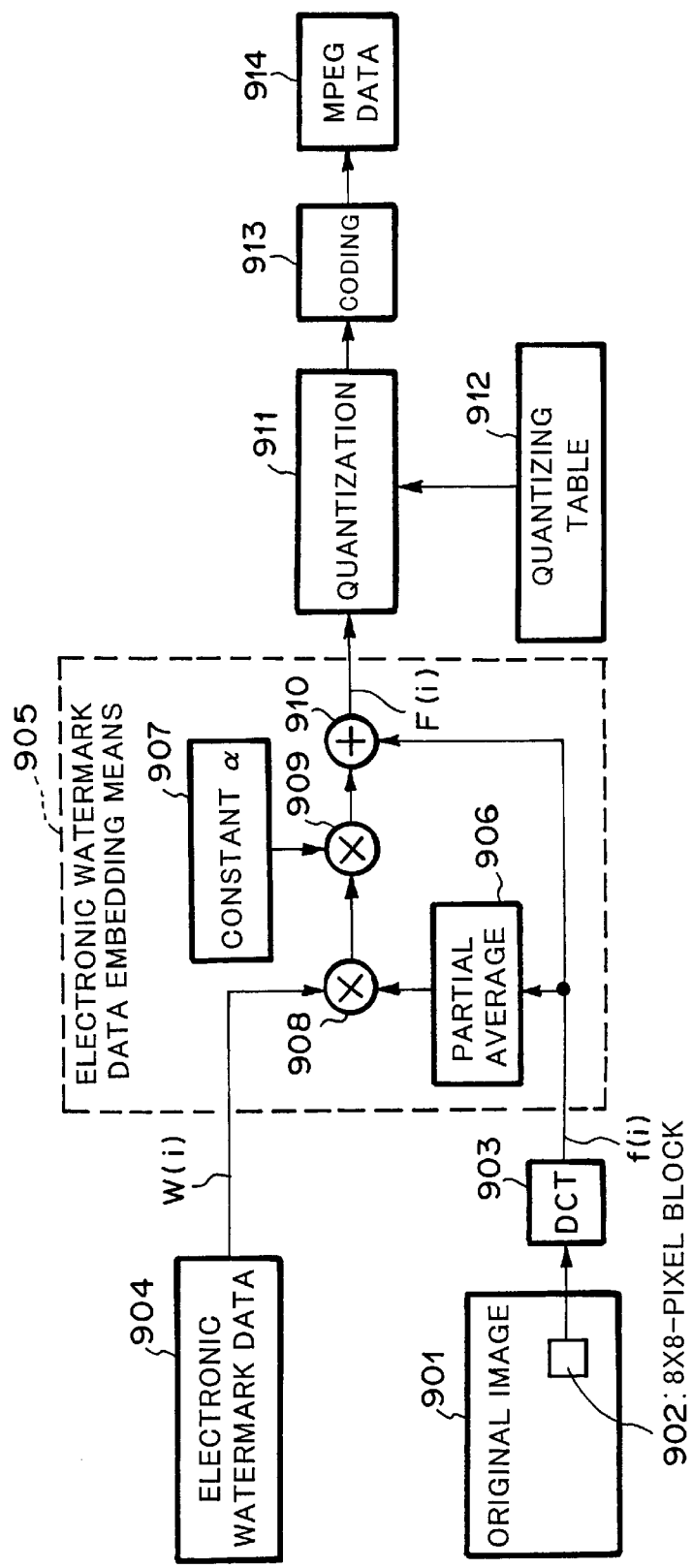
FIG. 9 is a block diagram showing a conventional electronic watermark data embedding device.
Figure 10:
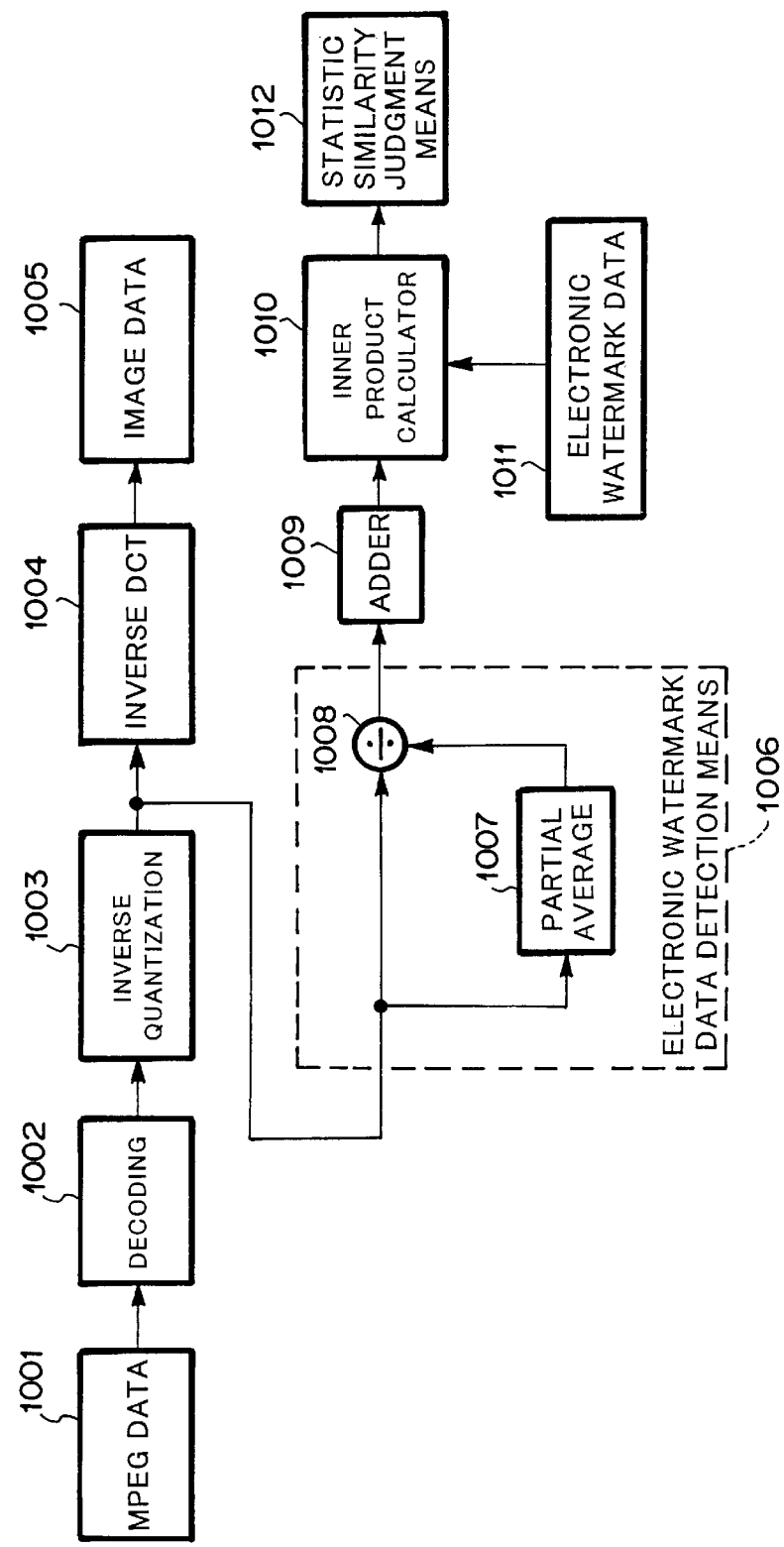
FIG. 10 is a block diagram showing a conventional electronic data embedding device.

Referring to FIG. 7, an original image 701 is first converted to frequency components by using DCT (Discrete Cosine Transform) 703. Data of n which have high amplitude are selected in the frequency area, and they are represented as follows: f(1), f(2), ..., f(n).

Further, electronic watermark data w(1), w(2), ..., w(n) are selected from a normal distribution having an average value of 0 and a dispersion value of 1, and the following equation is calculated for each (i) in the electronic data embedding means 704:

$$F(i)=f(i)+\alpha \times |f(i)| \times w(i)$$

Here, α represents a scaling element. Finally, by the inverse DCT (inverse Discrete Cosine Transform) 709, the output image 710 in which the electronic watermark data are embedded is obtained from the frequency components obtained by replacing f(i) with F(i). In this embodiment, electronic watermark data are inserted in a write-once style into an image in which electronic watermark data have been already inserted.

Figure 6:
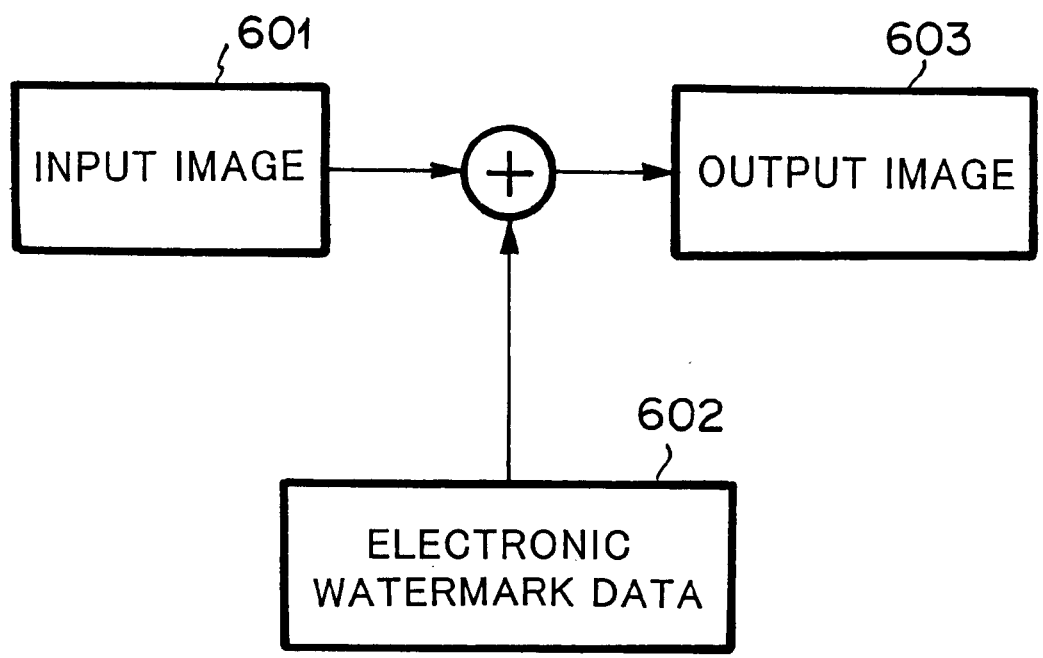
FIG. 6 is a block diagram showing an electronic watermark data insertion device according to the embodiment of the present invention.

In this embodiment, the operation of converting data to the frequency components (frequency area) through DCT which is normally carried out is omitted, and the data are directly inserted with being left time components (time area). The data to be inserted are substituted for a series of conversion such as DCT/electronic watermark embedding/inverse DCT as shown in FIG. 6, and the electronic watermark data are inserted every pixel block. When the electronic watermark data to be inserted are converted to frequency components through DCT, they are set to data in a frequency area different from that of the electronic watermark data which were previously embedded.

Through the above operation, the electronic watermark data which are beforehand embedded into an image are additionally altered to change the result of the attribute detection based on the electronic watermark data. Specifically, specific additive data are added to the signal calculated at the detection time to alter the result of the attribute detection. In this embodiment, a specific example of the internal construction of the additive insertion method as described above will be described in more detail.

Figure 3:
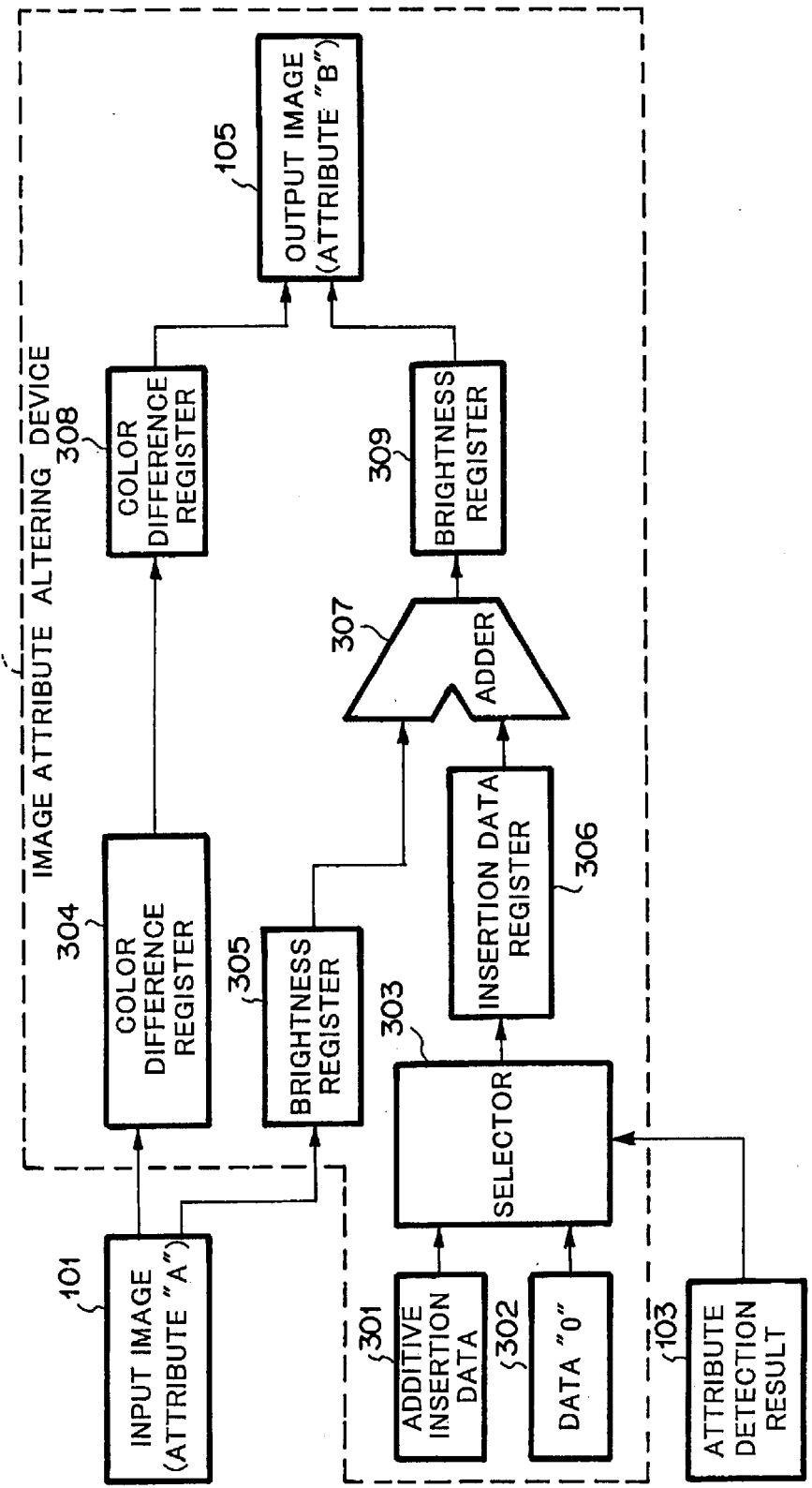
FIG. 3 is a block diagram showing an image attribute altering device according to the embodiment of the present invention.

FIG. 3 is a block diagram showing an image attribute altering device 104.

In FIG. 3, the image attribute altering device 104 has additive insertion data 301 and data "0" 302. The additive insertion data 301 are fixed data which are stored in ROM or RAM with being developed. The data "0" 302 have the same bit width as the additive insertion data 301, and all the bit values thereof are equal to "0". These data are selected on the basis of the attribute detection result 103 by a selector 303 and supplied to an insertion data register 306 to hold data at a time. The additive insertion data 301 are selected when the attribute detection result 103 is equal to "1" (the attribute of the input image 101 is "A"), and the data "0" 302 are selected when the attribute detection result 103 is equal to "0" (the attribute of the input image 101 is a value other than "A").

Here, as an example of the additive insertion data 301, three-dimensionally arranged numerals of 8×8×k (k represents a natural number and it is an inherent value to the system and called as "electronic watermark length") are added to one field or one frame. For example, one field or one frame is divided into 8×8 blocks, and a specific variable determinant of 8×8 is inserted to all the blocks or some of the blocks. The insertion data 301 of the electronic watermark length indicated in the specific variable determinant corresponds to the attribute "B", and it means "copy prohibited (impossible)".

The image attribute altering device 104 of this embodiment includes a color difference register 304 for holding color difference signal/brightness signal input from the input image 101, and a brightness register 305. These registers holds the color difference signal/brightness signal from the input image 101 at the same time when the data are stored in the insertion data register 306.

For the data thus held, an adder 307 provided in this embodiment adds the data held in the brightness register 305 and the data held in the insertion data register 306. Here, if the data selected on the basis of the attribute detection result 103 by the selector 303 correspond to the data "0" 302, the data to be additively inserted as a result is equal to "0", and the attribute is not altered. That is, when the attribute of the input image 101 is an attribute other than "A", the attribute of the output image 105 is not "B". That is, the attribute of the output image 105 is not "B" when the attribute of the input image 101 is an attribute other than "A".

When the data selected on the basis of the attribute detection result by the selector 303 are the additive insertion data 301, the data to be additively inserted as a result correspond to the additive insertion data 301. The additive insertion data 301 held in the insertion data register 306 are added with the data held in the brightness register 305 by the adder 307 to obtain a brightness signal, and the brightness signal obtained by inserting the additive insertion data 301 into the brightness components of the input image having the attribute "B" is held in the brightness register 309.

The data thus obtained are held as new brightness data in the brightness register 309. In this case, the contents of the brightness register 305 and the brightness register 309 are coincident with each other. IF the data of the insertion data register 306 is not equal to "0", the data has a different attribute "B".

Further, in order to keep the data at the same time, the data held in the color difference register 304 is directly supplied to and held in the color difference register 308. In this case, the color difference register 304 and the color register 308 are common.

The data in the brightness register 309 and the data in the color difference register 308 which are held at the same time output as image data having a new attribute to an output image 105. That is, if the original input image has the attribute "A", the image data containing the additive insertion data in addition to the attribute "A" becomes image data having the attribute "B".

In FIG. 3, in the case where the input image 101 is the overall frame image data, the adder 307 can easily add the additive insertion data into the input image if the additive insertion data is inserted into VBI which is a part of the input image. In the case where the input image 101 is image data of a block of p pixels×p pixels, the adder 307 can detect the block and add the additive insertion data if the additive insertion data are the data in the same area as the p pixels×p pixels.

Figure 4:
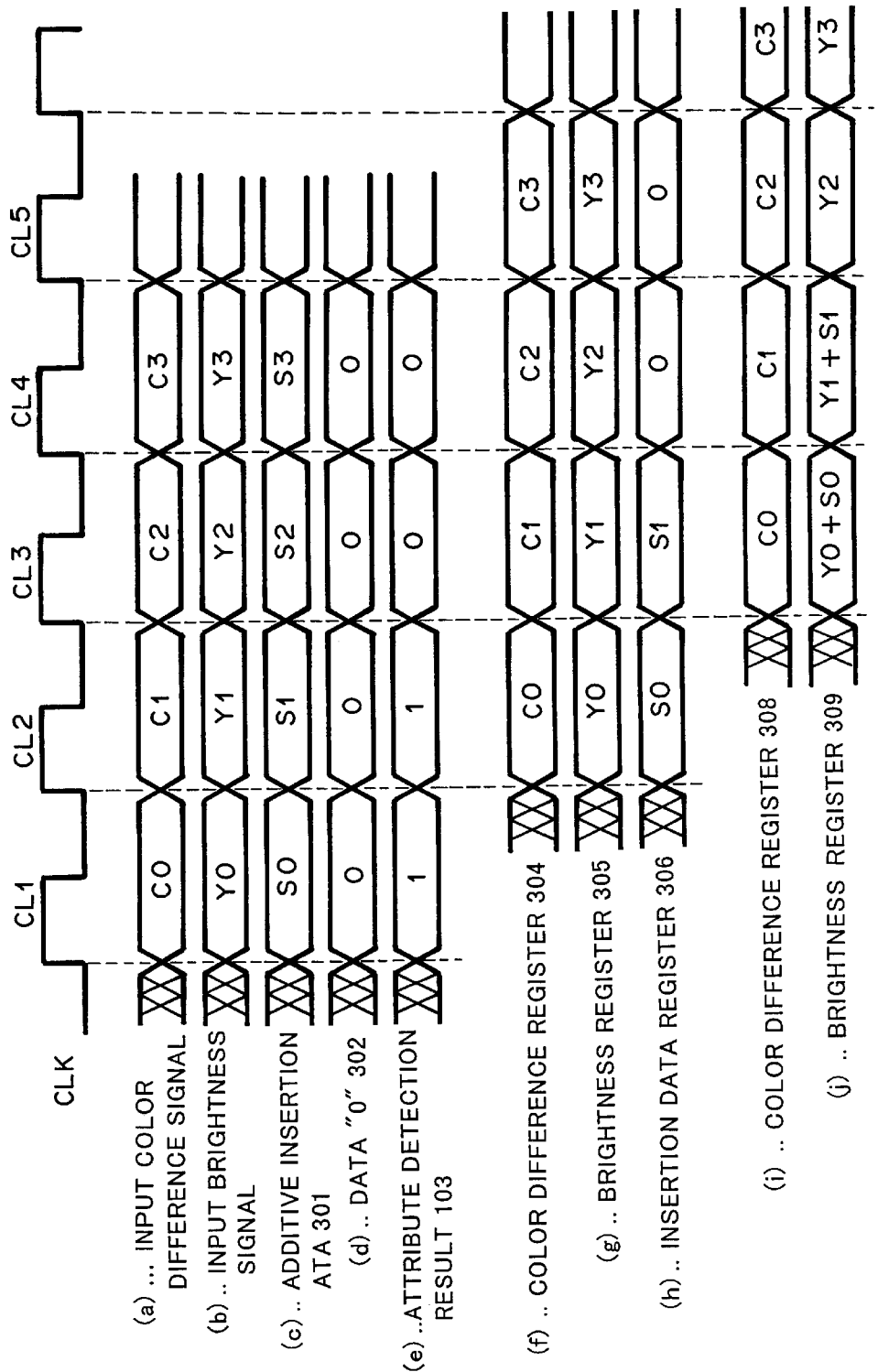
FIG. 4 is a flowchart showing the operation of the image attribute altering device according to the embodiment of the present invention.

The operation of this embodiment will be described. First the operation of the image attribute altering device 104 of this embodiment will be described with reference to a timing charge of FIG. 4.

First, the following conditions are assumed. That is, (a) an input color difference signal and (b) an input brightness signal are input from the input image 101, and at the same time (c) additive insertion data 301 are settled. (d) data "0" 302 are equal to "0" at all times. At the same time, (e) the value of an attribute detection result 103 is also input. Here, (c) the additive insertion data 301 are selected when (e) the value of the attribute detection result 103 is equal to "1", and (d) the data "0" 302 are selected when the value of the attribute detection result 103 is equal to "0". At the clock periods CL1, CL2, (c) the additive insertion data 301 are equal to "S0", "S1", and (e) the value of the attribute detection result 103 is equal to "1", "1".

At a next time (the rise-up time of a next clock in clock synchronization), (f) the color difference register 304 receives the input color difference signal, (g) the brightness register 305 receives the input brightness signal. Further, (h) the insertion data register 306 receives (c) the value of the additive insertion data 301 selected in (e) the attribute detection result 103 or (d) the data "0" 302. Specifically, at the clock periods CL2, CL3, (f) the value of the color difference register 304 is equal to "C0", "C1", (g) the value of the brightness register 305 is equal to "Y0", "Y1", and (h) the value of the insertion data register 306 is equal to "S0", "S1".

At a next time, (I) the color difference register 308 receives (f) the value of the color difference register 304, and (j) the brightness register 309 holds the addition result of (g) the value of the brightness register 305 just before and (h) the value of the insertion data register 306.

At a next time, (I) the signals of the color difference register 308 and (j) the brightness register 309 are output as a composite image signal (output image 105).

Specifically, at the clock periods CL3, CL4, (i) the color difference register 308 is equal to "C0", "C1", and (j) the brightness register 309 is equal to "Y0+S0", "Y1+S1". As a result, the output image is equal to "C0+Y0+S0", "C1+Y1+S1". These correspond to the above attribute "B". At the clock period CL5, (I) the color difference register 308 is equal to "C2", and (j) the brightness register 309 is equal to "Y2". As a result, the output image is equal to "C2+Y2" and the attribute "A" is output at a next time.

Consequently, when an image of the attribute "A" containing electronic watermark data is continuously input as an original image, the same image having the attribute "A" is continuously output. On the other hand, when an image of the attribute "A" containing electronic watermark data is discontinuously input, the same image having the attribute "A" is discontinuously output, and also an image of the attribute "B" is output to an empty image portion thereof.

As described above, the output image 105 (attribute "B") is generated from the input image 101 (attribute "A"). However, as described above, when the data "0" 302 are selected by the selector 303, the original data are output with no alteration, that is, the attribute is not altered.

In the above embodiment, the attribute detection result is extracted from the input image at least every frame, and the additive insertion data are inserted as electronic watermark data on the basis of the result. However, the attribute detection result may be extracted from only a specific block of the input image to insert the electronic watermark data into the block concerned. Besides, the input image is divided into plural blocks, the attribute detection result is extracted from each block, it is judged every block whether the additive insertion data of electronic watermark data should be inserted or not, and the additive insertion data is inserted into any block in which no electronic watermark data is inserted. In this case, any block has the attribute "A" and the attribute "B", and not only secrecy, but also permission or prohibition of copy can be easily detected.

Second Embodiment

The construction of the second embodiment of the present invention is basically the same as the first embodiment except for the input image.

The construction of the second embodiment will be described with reference to FIG. 5.

Figure 5:
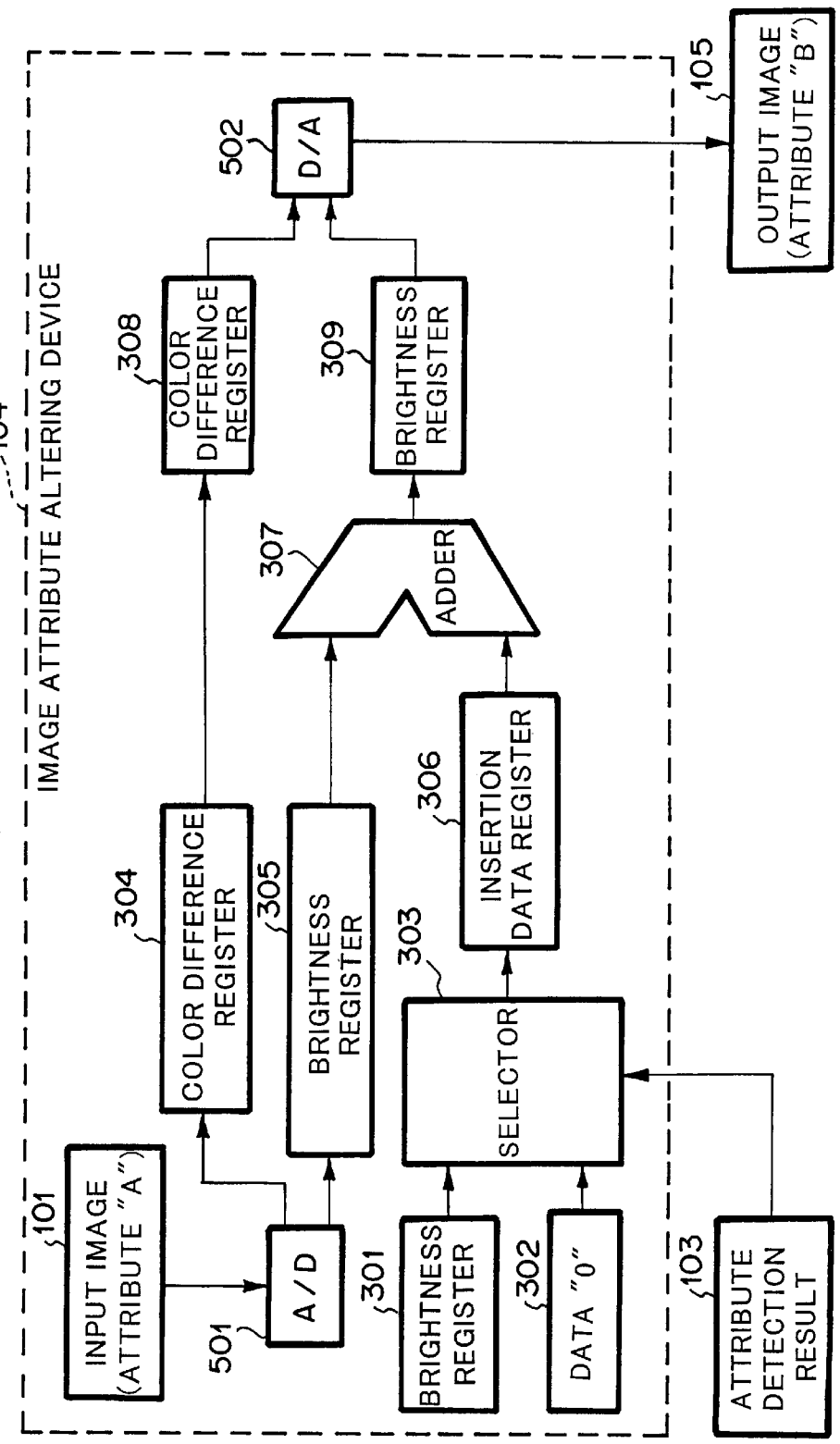
FIG. 5 is a block diagram showing the image attribute altering device according to another embodiment of the present invention.

In FIG. 5, the input image 101 having the attribute "A" is input as an analog (composite) signal, however, the subsequent processing after the input of the input image 101 may be the same as the first embodiment by using an A/D (analog-to-digital) converter 501. Further, for the output image 105, the image output having the attribute "B" can be obtained as an analog (composite) signal by the same construction as the first embodiment if the digitally-processed image data are converted to an analog (composite) signal by using a D/A (digital-to-analog) converter 502 as in the case of the input image.

It is needless to say that the A/D converter 501 at the input stage and the D/A converter 502 at the output stage may be used at the same time or not at the same time.

According to this method, the additive insertion of electronic watermark data can be performed in the attribute altering method of analog images, and thus the copyright of analog images can be protected.

The alteration of the attribute in this embodiment is carried out on the assumption that an original media work has an attribute "AAA" a work in which first electronic watermark data are inserted is altered to an attribute "B" and a work in which second electronic watermark data are additively inserted is altered to an attribute "CCC", and it is not carried out to inquire about whether a work is the original or not.

As described above, the attribute is altered by applying the electronic watermark data, so that the image thus obtained is an image in which electronic watermark data are inserted.

Accordingly, by providing an equipment side with means of detecting the attribute, unjust copies of digital images can be prevented.

Further, according to this embodiment, the selection based on the selector is adopted, so that the attribute is allowed not to be altered for some specific input images.

In addition, the insertion of the additive insertion data is performed by sequentially inserting the additive insertion data into the input image, and thus there is an effect that the output image can be obtained on a real-time basis.

Further, for example, when the meaning of the attribute "A" is set to "copy is allowed only once", and the meaning of the attribute "B" is set to "copy is prohibited", the image data whose attribute is altered to the attribute "B" is prohibited from being afterwards copied, and the copyright can be protected.

Although, the present invention has been shown and described with respect to best mode embodiments thereof, it should be understood by those skilled in the art that the foregoing and various other changes, omissions, and additions in the form and detail thereof may be made therein without departing from the spirit and scope of the present invention.

What is claimed is:

1. An electronic watermark embedding device comprising:

discrete cosine transform means for subjecting an input image to discrete cosine transform;

electronic watermark detection means for detecting whether electronic watermark data to be inserted by an electronic watermark embedding means have been already inserted in the input image;

electronically embedding means for inserting electronic watermark data into input image data converted by the discrete cosine transform means; and selection means for directly outputting the input image with no modification when it is detected by said electronic watermark detection means that the electronic watermark data has been inserted in the input image, or embedding new electronic watermark data into the input image when the insertion of the electronic watermark data is not detected, wherein said electronic watermark detection means performs the following operations: on the assumption that the original image and electronic watermark data candidates w(i)(i=1, 2, . . . ,n) are known, an image containing electronic watermark data is subjected to orthogonal transform to be converted into frequency components as f(1),f(2), . . . , F(n);

representing the values of elements corresponding to the frequency components containing the electronic watermark data in the frequency domain by F(1), F(2), . . . , F(n), the electronic watermark data W(i) is calculated and extracted on the basis of f(i) and F(i) according to the following equation:

$$W(i)=(F(i)-f(i))/f(i);$$

the statistical similarity C between w(i) and W(i) is calculated and extracted by using vector inner product according to the following equation:

$$C=W \cdot w/(WD \times wD),$$

Here,

W=(W(1), W(2), . . . , W(n))

w=(w(1), w(2), . . . , w(n))

WD=absolute value of vector W wD=absolute value of vector w

"·" represents inner product;

when the statistical similarity C is above a predetermined value, it is detected that the electronic watermark data have been embedded in the image.

2. An electronic watermark embedding device comprising.

detection means for detecting whether or not a first electronic watermark data is inserted into an input image in frequency-domain; and insertion means for inserting predetermined data into only a brightness signal of the input image;

wherein said insertion means has a selector for selecting a second electronic watermark data different from the first electronic watermark data in frequency-domain, when said detection means detects a fact that the first electronic watermark data is inserted into the input image, and for selecting a data of zero, when said detection means does not detect a fact that the first electronic watermark data is inserted into the input image, and an adder for adding a data selected by said selector to the brightness signal.

3. The electronic watermark embedding device as claimed in claim 2, wherein said detection means has means for converting the input image into image frequency components through discrete cosine transform, means for converting an original image into original frequency components through discrete cosine transform, means for subtracting the original frequency components from the image frequency components, and means for dividing a difference on the subtraction by the image frequency components.

4. The electronic watermark embedding device as claimed in claim 3, wherein said detection means has means for calculating an inner product between the result of the division and the first electronic watermark data, means for extracting a statistical similarity by the inner product, and means for deciding the fact that the first electronic watermark data is inserted into the input image, when the statistical similarity is greater than a predetermined value.

* * * * *